(12) United States Patent
DeVilliers (10) Patent No.: US 9,618,151 B2
(45) Date of Patent: Apr. 11, 2017

(54) COMPACT MODULAR LOW RESISTANCE BROADBAND ACOUSTIC SILENCER

(71) Applicant: Adriaan DeVilliers, Bradenton, FL (US)

(72) Inventor: Adriaan DeVilliers, Bradenton, FL (US)

( * ) Notice: Subject to any disclaimer, the term of this patent is extended or adjusted under 35 U.S.C. 154(b) by 0 days.

(21) Appl. No.: 15/051,737

(22) Filed: Feb. 24, 2016

(65) Prior Publication Data

US 2016/0252204 A1 Sep. 1, 2016

Related U.S. Application Data

(60) Provisional application No. 62/121,119, filed on Feb. 26, 2015.

(51) Int. Cl.
| | | |
|---|---|---|
| *F24F 13/24* | (2006.01) | |
| *F16L 55/033* | (2006.01) | |
| *F01N 13/18* | (2010.01) | |
| *F01N 1/02* | (2006.01) | |
| *F01N 1/08* | (2006.01) | |

(52) U.S. Cl.
CPC .......... *F16L 55/0336* (2013.01); *F01N 1/026* (2013.01); *F01N 1/086* (2013.01); *F01N 13/18* (2013.01); *F24F 13/24* (2013.01); *F01N 2210/04* (2013.01); *F24F 2013/242* (2013.01); *F24F 2013/245* (2013.01)

(58) Field of Classification Search
CPC ................................... F01N 1/04; F24F 13/24
USPC ................................................. 181/249, 212
See application file for complete search history.

(56) References Cited

U.S. PATENT DOCUMENTS

| 821,828 A | 5/1906 | Phelps et al. |
|---|---|---|
| 1,419,606 A | 6/1922 | Benedict |
| 2,233,804 A | 3/1941 | Bourne |
| 2,297,046 A | 9/1942 | Bourne |
| 2,486,133 A | 10/1949 | Egger |
| 2,840,179 A | 6/1958 | Junger |
| 3,422,853 A | 1/1969 | Schmid |
| 3,724,502 A | 4/1973 | Hayner et al. |
| 3,776,364 A | 12/1973 | Van Doeren |
| 3,783,969 A | 1/1974 | Pall |
| 3,837,426 A | 9/1974 | Kleinschmidt |
| 4,032,398 A | 6/1977 | Cross et al. |

(Continued)

FOREIGN PATENT DOCUMENTS

JP 57113919 A * 7/1982

*Primary Examiner* — Forrest M Phillips
(74) *Attorney, Agent, or Firm* — Maxey Law Offices, PLLC; Stephen Lewellyn (57) ABSTRACT

An acoustic silencer for dampening unwanted resonant and pressure pulses in a pipe or duct work and includes an expansion chamber having an enclosed volume through which a pipe or duct work extends, thereby defining an annular volume within the enclosed volume between the process pipe and the expansion chamber. An insert disposed within the annular volume extends along the length of the process pipe and forms an acoustic volume within the annular volume and defines a resonant passage length that is of a length so as to dampen one or more frequencies of the process pipe. An opening is formed through the process pipe along the length of the process pipe that extends through the expansion chamber and is in fluidic communication with the acoustic volume.

10 Claims, 11 Drawing Sheets

(56) References Cited

U.S. PATENT DOCUMENTS

| | | | | |
|---|---|---|---|---|
| 4,093,110 | A | 6/1978 | Johnson | |
| 4,102,359 | A | 7/1978 | Patel | |
| 4,135,603 | A | 1/1979 | Dean, III et al. | |
| 4,324,314 | A | 4/1982 | Beach et al. | |
| 4,523,662 | A * | 6/1985 | Tanaka | C09D 5/18 181/249 |
| 4,530,418 | A | 7/1985 | Currie | |
| 4,562,036 | A | 12/1985 | Shin et al. | |
| 4,562,901 | A | 1/1986 | Junger et al. | |
| 4,834,214 | A * | 5/1989 | Feuling | F01N 1/10 181/249 |
| 5,101,930 | A * | 4/1992 | Fargo | F16L 55/0332 181/233 |
| 5,313,525 | A | 5/1994 | Klasco | |
| 5,493,080 | A | 2/1996 | Moss | |
| 6,109,387 | A | 8/2000 | Boretti | |
| 6,167,985 | B1 | 1/2001 | Van Ligten | |
| 6,926,117 | B2 | 8/2005 | Sterling | |
| 7,185,678 | B1 | 3/2007 | Stell et al. | |
| 7,730,997 | B2 | 6/2010 | Asada et al. | |
| 7,789,194 | B2 | 9/2010 | Lathrop et al. | |
| 7,848,475 | B2 | 12/2010 | Kaufman et al. | |
| 7,905,321 | B2 | 3/2011 | Ballard, III | |
| 8,083,025 | B2 * | 12/2011 | Murakami | F01N 1/24 181/249 |
| 8,312,962 | B2 * | 11/2012 | Melcher | F01N 1/081 181/212 |
| 8,360,199 | B2 * | 1/2013 | Miller | F02M 35/10386 123/184.21 |
| 8,393,437 | B2 | 3/2013 | Longoni et al. | |
| 2004/0050618 | A1 | 3/2004 | Marocco | |
| 2004/0140149 | A1 | 7/2004 | Terpay et al. | |
| 2004/0238273 | A1 * | 12/2004 | Fritskey | F01N 1/12 181/264 |
| 2005/0194207 | A1 | 9/2005 | Nemit, Jr. et al. | |
| 2005/0279568 | A1 * | 12/2005 | Seyler | F02M 35/116 181/249 |
| 2007/0107982 | A1 * | 5/2007 | Sullivan | F01N 1/06 181/249 |
| 2008/0149201 | A1 | 6/2008 | Sommerville et al. | |
| 2009/0145688 | A1 | 6/2009 | Marcoux | |
| 2010/0101890 | A1 * | 4/2010 | Kim | F01N 1/125 181/252 |
| 2011/0024228 | A1 * | 2/2011 | Murakami | F01N 1/24 181/249 |

* cited by examiner

COMPACT MODULAR LOW RESISTANCE BROADBAND ACOUSTIC SILENCER

CROSS-REFERENCE TO RELATED APPLICATIONS

This application claims the benefit of U.S. Provisional Application No. 62/121,119, filed Feb. 26, 2015, the entirety of which is incorporated herein by reference.

FIELD OF THE INVENTION

The present invention relates generally to acoustic damping devices, and more particularly, relating to acoustic damping in pipes and ducts.

BACKGROUND OF THE INVENTION

Cavity resonance in a gas or liquid medium is a universal and fundamental phenomenon found in pre-historic to modern animal sound chambers, pipe and duct shaped organs, musical instruments, industrial applications, the aeronautical industry, engines, and equipment. Today, the science to determine the resonant frequencies of a multitude of these cavities, pipes, and ducts is widely understood in science and engineering. In music, such resonances are appreciated, but in industrial, automotive, and aeronautical applications for example, acoustic resonances are frequently undesirable and can lead to failure of structures, systems and components, and noise pollution. Accordingly, control or suppression of acoustic resonance is a large field with many diverse applications. While the devices heretofore meet their respective and particular objectives, there remains a need for improved control or suppression of acoustic resonance.

SUMMARY OF THE INVENTION

Embodiments of the present invention addresses these needs by providing a compact modular low resistance broadband acoustic silencer including no moving parts, and configured to attenuate a wide range of frequencies that typically cause undesirable acoustic resonance in pipes and ducts primarily such as found in industrial environments, air-conditioning, and the automotive and aeronautical industries. The acoustic silencer has a very compact format that is arranged surrounding a pipe or duct transporting a flow of liquid or gas medium with very little resistance. The acoustic silencer has modular inserts that provide different acoustic performance properties to suit specific environments and objectives. The acoustic silencer is suitable for either zero net-mass transfer applications such as in closed-ended pipes with standing pressure waves, or in active-mass transfer applications such as with an exhaust muffler, and in pipes with travelling pressure waves.

The acoustic silencer can suppress harmful standing acoustic waves in piping at steam-driven power stations where these waves are excited by vortex shedding and/or turbulence at flow discontinuities (e.g. branch pipes) or by other flow phenomena that couple with open-ended (half-wave) or closed-ended (quarter-wave) resonators/pipes and cavities. Examples of process piping resonators are found at safety-relief valves in steam piping, vent and drain lines, mini-flow lines for pumps, or at closed valves. Undesired acoustic responses are also caused by pump or turbine vanes, compressors, turbulent flow and cavitation. The effectiveness of the acoustic silencer does not depend on the source of the acoustic response. In one of its attractive applications, the acoustic silencer may be installed as standard precautionary practice at pipe/duct dead-ends and upstream of valves to pro-actively mitigate undesirable acoustic responses and to thereby allow higher flow rates for potential power or production up-rates.

In contrast to some prior devices, the acoustic silencer does not require the addition of damping material (such as wire mesh) to substantially reduce acoustic energy and thereby dampen/reduce/suppress the acoustic pulsation amplitudes. Damping material such as wire mesh may nevertheless be added in order to further dampen acoustic waves and enhance the acoustic performance of the device if desired.

Figure 1:
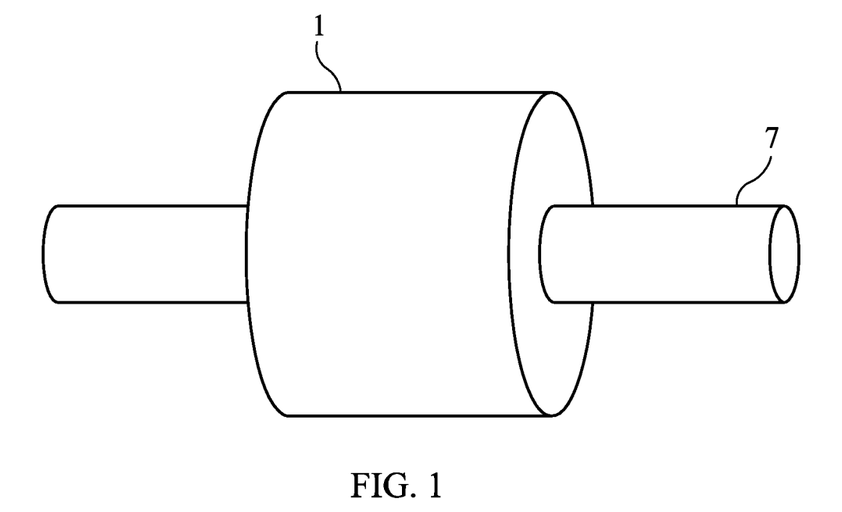
FIG. 1 is a diagrammatic view of a compact modular low resistance broadband acoustic silencer constructed in accordance with the principles of an embodiment of the present invention.

Fundamentally, the acoustic silencer uses an expansion chamber with various inserts that modify all or part of the expansion chamber into a hybrid resonator. This configuration is designed and tuned to mitigate undesired pulsation frequencies, with or without damping material in parts of the enclosed volume. The primary principal of operation of the expansion chamber and its inserts is that of acoustic interference rather than sound absorption as would be provided by dampening material. Prototype tests indicate that the three fundamental configurations of this device are more effective over a wider frequency range for its size and much more compact than available passive-silencer alternatives. A schematic appearance of an exemplary embodiment of the acoustic silencer is shown in FIG. 1, outwardly appearing as an expansion chamber around process piping.

Throughout the text, the terms pipe, piping, process piping, duct and ducting are used interchangeably. And "tones" are used interchangeably with "frequencies". A "mode shape" is the 3-dimensional shape of pressure or velocity contours when resonating at a particular frequency. Most commonly, each mode shape is associated with a natural frequency of vibration. Hence the term "mode shape" commonly implies both a resonant frequency and its associated pressure or velocity contour shape.

Figure 6:
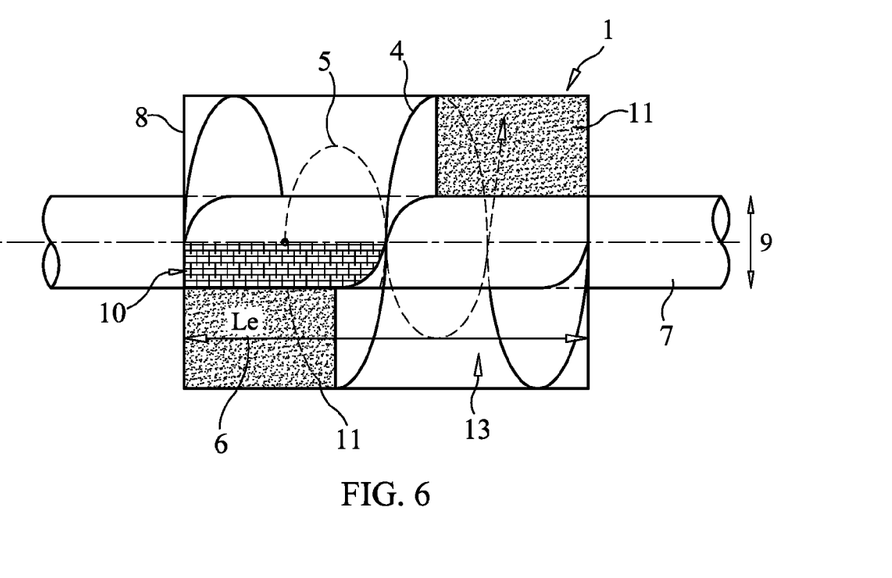
FIG. 6 is a diagrammatic transparent, side elevation view of an embodiment of a compact modular low resistance broadband acoustic silencer constructed in accordance with the principals of an embodiment of the invention, illustrating a "S" type insert.
Figure 7:
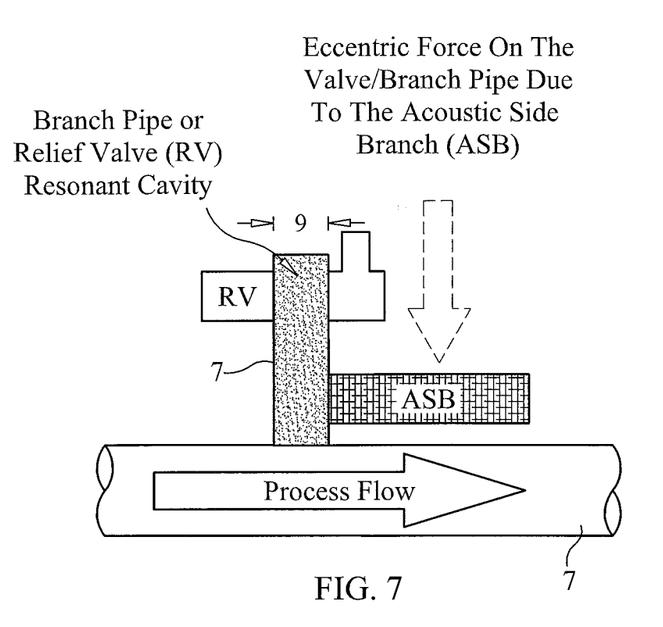
FIG. 7 is a diagrammatic view of an embodiment of an acoustic side branch (ASB) suppression device for a valve, in a configuration synonymous to that depicted in FIG. 8.
Figure 8:
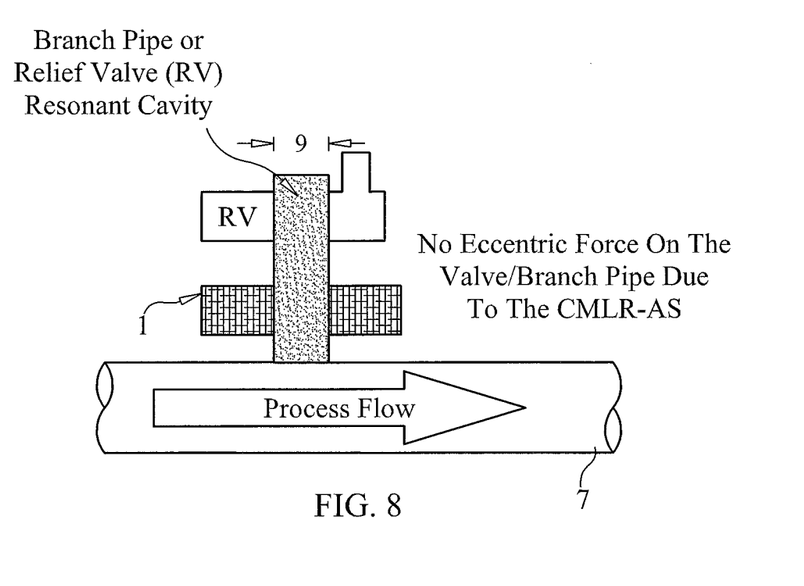
FIG. 8 is a diagrammatic view of an embodiment of a compact modular low resistance broadband acoustic silencer in accordance with the principals of an embodiment of the invention, showing the silencer in-use, in a configuration for a pressure relief valve.
Figure 16:
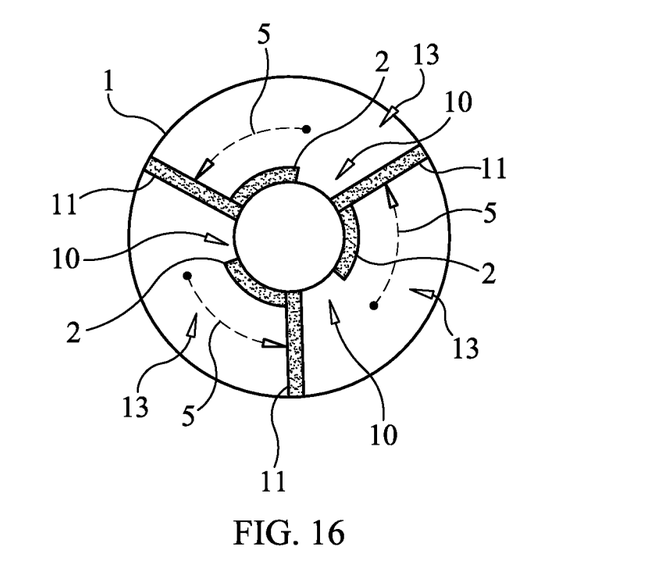
FIG. 16 is a diagrammatic cross-sectional view similar to FIG. 3 illustrating multiple "Q" type inserts.
Figure 17:
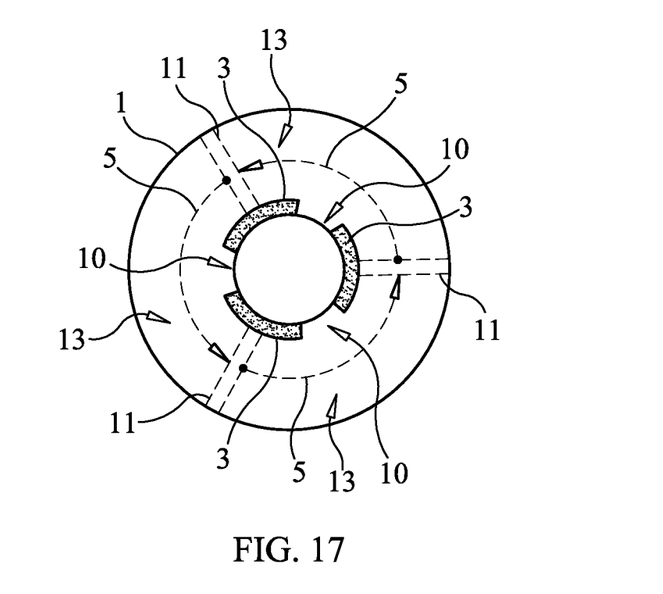
FIG. 17 is a diagrammatic cross-sectional view similar to FIG. 5 illustrating multiple "C" type inserts.

The three fundamental configurations (inserts) for the acoustic silencer include a "Q" insert (FIGS. 2-3), a "C" insert (FIGS. 4-5), and an "S" (spiral) insert (FIG. 6). All three fundamental types of inserts maintain flow of the process medium through the length of the device and form an acoustic volume between the insert and the expanded chamber. The inner portion of each insert forms a continuation of the process pipe through the device with an opening in it to the expansion chamber as shown in FIGS. 2-3, FIGS. 4-5, and FIG. 6. Illustrative multiple instance embodiments of "Q" inserts and "C" inserts are shown in FIGS. 16-17 respectively. Note that the Q-insert is similar to the C-insert but with a barrier wall placed adjacent to the opening to the expansion chamber.

Should the required circumferential length of annular passage between the insert and the expansion chamber exceed the circumference of the expansion chamber, the annular passage length can be extended by spiraling the passage around inside the expansion chamber (hence the "S" insert), while maintaining the bore of the process pipe or duct through its center as illustrated in FIG. 6. Conversely, should the required length of the internal passage be less than the circumference of the expansion chamber, the passage length can be shortened by placing a barrier wall between the insert and the expansion chamber at the desired distance from the opening in the insert (in effect a "Q" insert with a second barrier wall), or by creating multiple instances of the "C" or "Q" inserts as illustrated in FIG. 16-17. The result is a very compact and very low flow resistance acoustic silencer that suppresses acoustic resonance over a wide frequency range.

When configured for retro-fit of existing branch pipes, ducts, or valves (for example at safety-relief valves, pipe ends, and blank flanges in nuclear power stations), the acoustic silencer can be installed without changing the location of the valve, pipe end, or blank flange. In contrast to an external-cantilevered acoustic side-branch suppression (ABS) device (also known as a quarter wave resonator) for a valve, by surrounding the system piping, the acoustic silencer will not introduce any out-of-plane stresses to the piping and will have negligible effect on the seismic qualification of the piping. Also, by maintaining the internal bore of the piping through the acoustic silencer, any change in through-flow resistance is minimal to negligible. In one embodiment of the acoustic silencer, it can be assembled using readily available piping parts with bolted flanges and suitable gaskets. However, the manufacturing technique is not a restriction on the claims of this patent.

Where configured as a muffler for an automobile, the compact shape and low flow resistance of the acoustic silencer offer minimal construction cost and maximum flow rate. The high flow rate maximizes the power potential of an internal combustion engine, while achieving low sound emissions. Satisfying what are commonly opposing design features in the field of performance exhaust mufflers. The compact design of the acoustic silencer allows placement of more than one of the same or different insert embodiments along the piping in order to create desired acoustic silencing.

Furthermore, the orientation and shape of the piping do not restrict the acoustic silencer function of the invention. It is not a requirement that the piping or the acoustic silencer be straight, rather the acoustic silencer can be curved to follow the geometry of the piping as long as the acoustic silencer surrounds the piping. Finally, the acoustic silencer need not be circular in cross-section, but only needs to form an expanded volume surrounding the process piping to accommodate the inserts. For piping, the acoustic silencer will most commonly be cylindrical (oval or circular), while for ducting it will most commonly be circular or rectangular.

A unique advantage of the acoustic silencer is that no out-of-plane stresses are introduced by the device. The acoustic silencer, in its embodiment with pressure relief valves (FIG. 7-8), illustrates the stress advantage as well as allowing the relief valve location in three dimensions and the upstream and downstream piping to be unaffected by the acoustic silencer. As illustrated in FIGS. 7, 8, and 10-15, the inserts offer distinctly better broadband acoustic suppression than the S-insert or a conventional ASB (with or without damping material). By extending the internal opening of the "S" insert across more than one revolution of the insert, its acoustic response becomes very different from an acoustic side branch.

A feature of the S-insert that distinguishes it from prior art is that the S-insert provides only one opening to the expansion chamber with no requirement for a separate sound cancellation or conversion chamber. As such, the S-insert occupies the entire length of the expansion chamber.

Another unique advantage of the acoustic silencer is that, by not requiring damping material, the potential of introducing foreign material from the silencer into the flow medium is for all practical purposes eliminated.

In general, in one aspect, an acoustic silencer is provided. The acoustic silencer includes an expansion chamber having an enclosed volume and a process pipe extending continuously through the enclosed volume, thereby defining an annular volume within said enclosed volume between the process pipe and the expansion chamber. An insert is disposed within the annular volume and extends along the length of the process pipe that extends through the expansion chamber. The insert creates an acoustic volume within the annular volume. The insert defines a resonate passage length within the acoustic volume that is of a length so as to dampen one or more frequencies of said process pipe. An opening is formed through the process pipe along the length of the process pipe that extends through the expansion chamber. The opening extends over less than a circumference of the process pipe and is in fluidic communication with the acoustic volume.

In general, in another aspect, the insert is selected from a C-type insert, a Q-type insert, and an S-type insert.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

In process piping, there exist numerous flow phenomena that are capable of exciting natural acoustic frequencies from the piping, not unlike the natural acoustic frequencies produced by the complex piping of a French-horn musical instrument. Examples of flow phenomena that can initiate and sustain natural acoustic frequencies in piping and cavities include: vortex shedding at branch pipes, flow obstructions and discontinuities, flow turbulence, cavitation, rotating vanes/blades/elements passing nearby obstructions (such as in pumps, turbines, electric motors), general flow turbulence, concentrated flow turbulence, pressure pulses by internal combustion engines, numerous engine types, and compressors.

The natural acoustic frequencies may take the form of travelling or standing pressure waves. The frequency of the pressure waves is dependent upon the geometry of the piping (typically its length), and the speed of sound in the medium transported by the piping. The speed of sound in the medium is primarily a function of the density, viscosity, temperature, and pressure of the medium. It is also influenced by the ductility/flexibility of the piping itself, the flow rate of the transported medium, the roughness of the piping, and the geometry of the piping.

The pressure waves in the piping determine the location of pressure nodes, velocity nodes, and anti-nodes along the piping. For example, in the case of a quarter-wave resonator, the closed-end is a pressure wave reflection point where the acoustic pressure is a maximum but the particle velocities are zero (i.e. a velocity node); whereas at the open end, the pressure is at minimum (i.e. a pressure node) but the particle pulsation velocities are at maximum (i.e. a velocity anti-node). Knowing where the pressure nodes and/or velocity nodes are and where it would be feasible to install the acoustic silencer 1, will help determine which insert 2, 3, 4 would be better suited to interfere with the acoustic waves and thereby suppress the undesired natural acoustic frequencies. Nevertheless, all of the inserts 2, 3, 4 (FIGS. 2, 4, and 6 respectively) provide excellent suppression over a wide frequency range when acoustic silencer is located at or near either end, or along the piping. There are also significant advantages over a simple acoustic side-branch suppression device, with or without damping material in it. By illustration of interference, an acoustic side-branch device is much less effective when located near the open end of a resonant cavity because it has its natural pressure node at its open end, coincident with the natural pressure node of the acoustic cavity. Conversely, when an acoustic side-branch is placed at the closed end of a resonant cavity, the natural pressure node at the mouth of the acoustic side-branch interferes with the natural pressure anti-node of the resonant cavity at that same location, thereby cancelling that resonant frequency by interference.

In the event that an acoustic side-branch device is desired, the spiral S-insert 4 (FIG. 6) can be configured when the opening 10 is only within one revolution of the insert. Thus representing a quarter-wave resonator that ensures that the appropriate passage length 5 can be attained without cantilevering away from the process piping 7, and thereby providing the most compact arrangement for an acoustic side-branch resonator among alternative designs.

In process piping, a quarter-wave resonator is basically a length of piping that is open on one end to process fluid or a relatively large volume environment, and closed at the opposite end. A half-wave resonator usually has one of three basic configurations: (1) a length of piping that is open at both ends to process fluid or a relatively large volume environment (such as the atmosphere or a large vessel), (2) piping that is closed at both ends (such as a header pipe), or (3) piping that is similar to a quarter-wave resonator but which is tapered down to a minimum at the closed end while open at the other end. Each of these (1), (2), or (3) resonators produce multiple prominent harmonics of its first/fundamental tone. Each of the half-wave resonators (1) and (2) can be interpreted as two mirror image quarter-wave resonators. In general, quarter-wave configurations are often preferred over half-wave configurations because it is shorter for a specific tone.

Numerous technologies exist to determine the natural acoustic frequencies of the piping. The most common natural acoustic frequencies are the quarter-wave resonators, half-wave resonators, and simple cavities. The calculations of these frequencies can easily be made by hand. The calculations presented below are for exemplary embodiments of the acoustic silencer 1 as a cylindrical chamber 8, concentric to cylindrical piping 7. However, the same techniques apply to different geometries of the acoustic silencer (for example oval-shaped or square-shaped device surrounding non-circular cross section piping).

Figure 2:
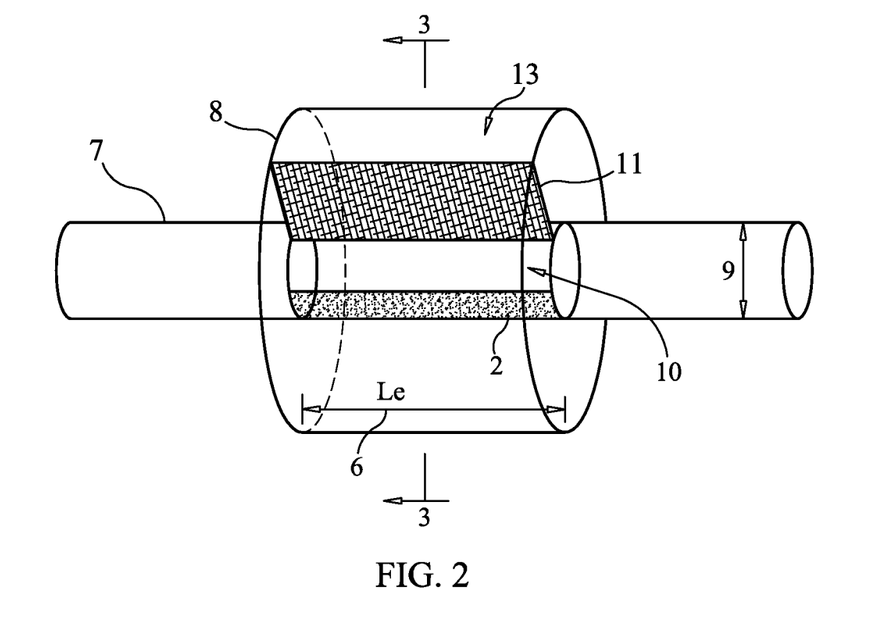
FIG. 2 is diagrammatic transparent side elevation view of an embodiment of a compact modular low resistance broadband acoustic silencer constructed in accordance with the principals of an embodiment of the invention, illustrating a "Q" type insert.
Figure 3:
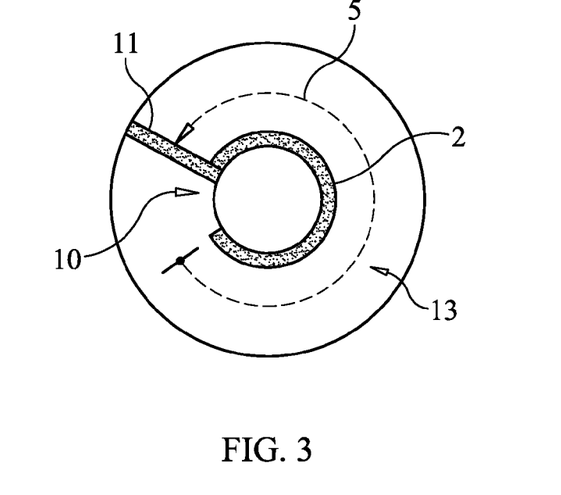
FIG. 3 is a diagrammatic cross-sectional view taken along line 3-3 in FIG. 2 illustrating the "Q" type insert.
Figure 4:
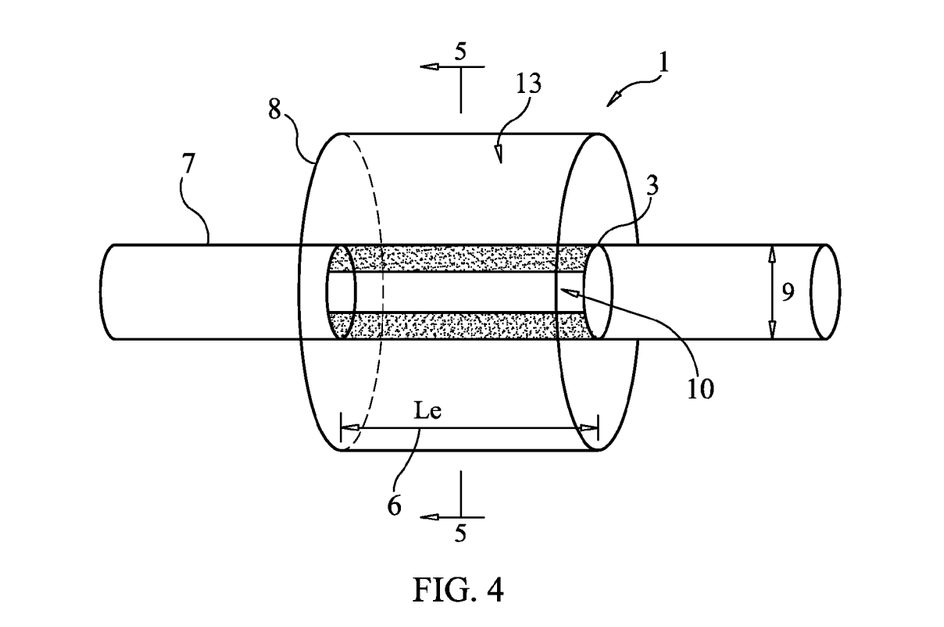
FIG. 4 is a diagrammatic transparent, side elevation view of an embodiment of a compact modular low resistance broadband acoustic silencer constructed in accordance with the principals of an embodiment of the invention, illustrating a "C" type insert.
Figure 5:
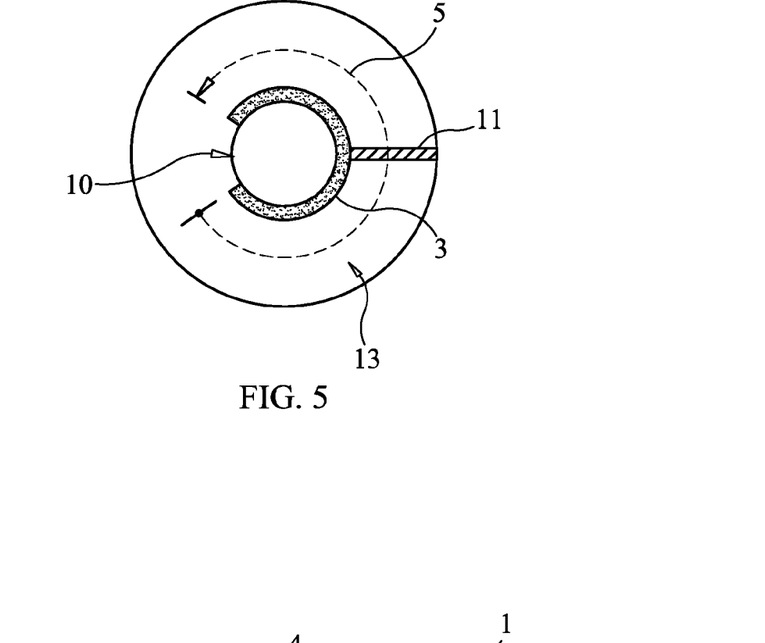
FIG. 5 is a diagrammatic cross-sectional view taken along line 5-5 in FIG. 4 illustrating the "C" type insert.

The second step in design of acoustic silencer 1 is to select the approximate size of the expansion chamber/outer shell 8, FIGS. 2, 4, and 6. One way to accomplish that is to use the formulae for the cut-off frequency of a high-pass filter expansion chamber, as in Equation 1. The desired cut-off frequency depends on the design objectives.

$$f=c*Am/(Pi*Le(Ae-Am))$$

Equation 1: Low pass filter cut-off frequency
Where f is the cut-off frequency,
Am is the inside cross-sectional area of the process piping 7,
Ae is the inside cross-sectional area of the expanded volume 8,
Pi=3.14159,
Le is the inside length of the expanded volume 6, and
c is the speed of sound in the contained medium Equation 1 does not represent the resonant frequency of the acoustic silencer 1 with inserts, but merely present a convenient starting point for sizing the overall expanded volume 8 that has a desired cut-off frequency. The dimensions of such an empty expanded volume can also be determined by other means, including experimentation.

Figure 9:
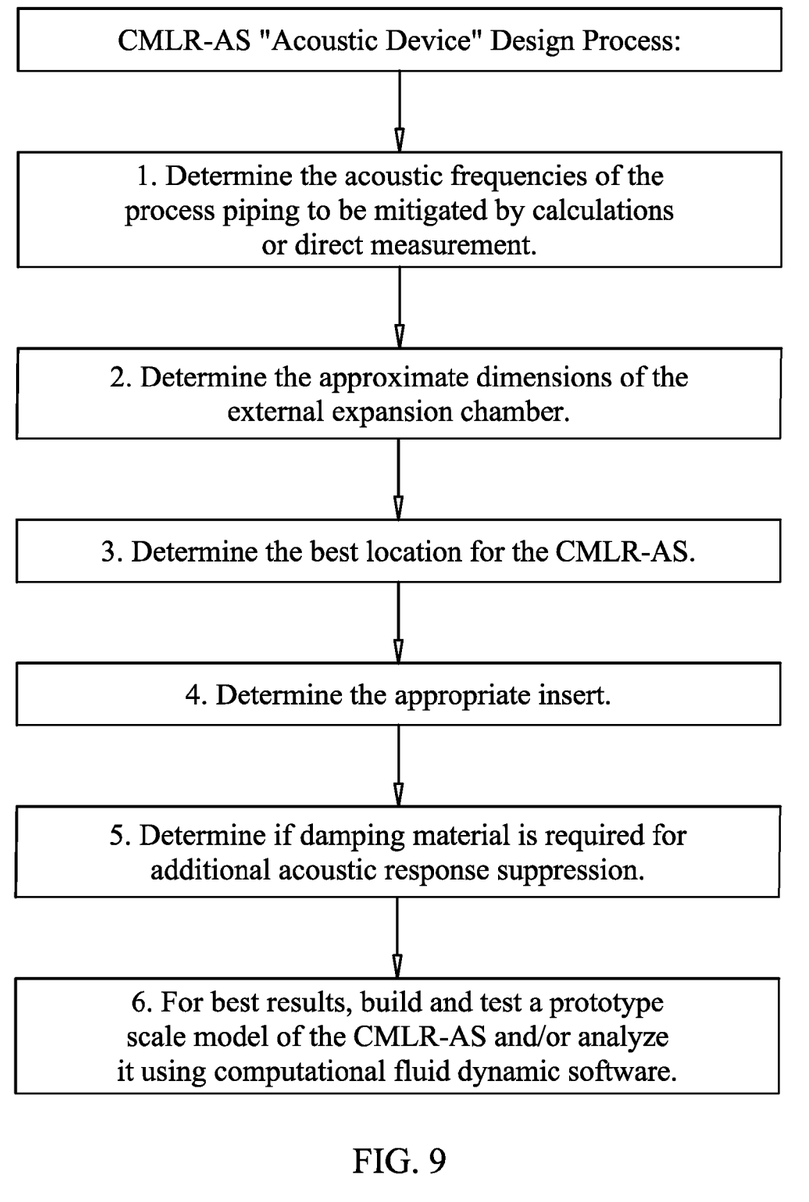
FIG. 9 is a flow diagram illustrating an exemplary process of designing a compact modular low resistance broadband acoustic silencer in accordance with the principals of an embodiment of the invention.
Figure 10:
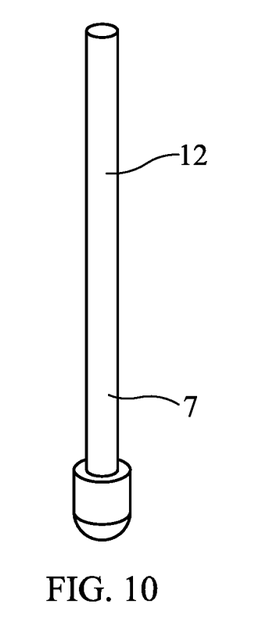
FIG. 10 is a diagrammatic, side elevation view illustrating an exemplary test pipe used as a 190 Hz quarter-wave resonator.
Figure 11:
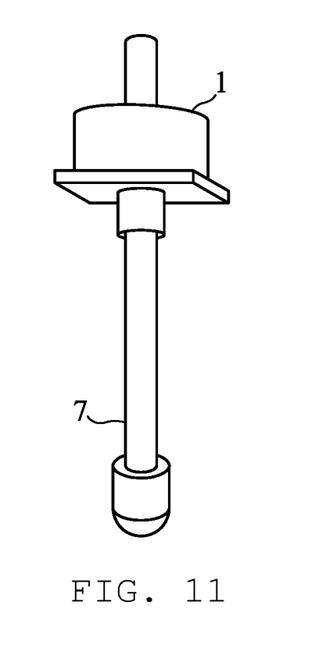
FIG. 11 is a diagrammatic, side elevation view illustrating a second exemplary test pipe equipped with a compact modular low resistance broadband acoustic silencer in accordance with the principals of an embodiment of the invention, tuned to the same overall length as the resonator in FIG. 10.
Figure 12:
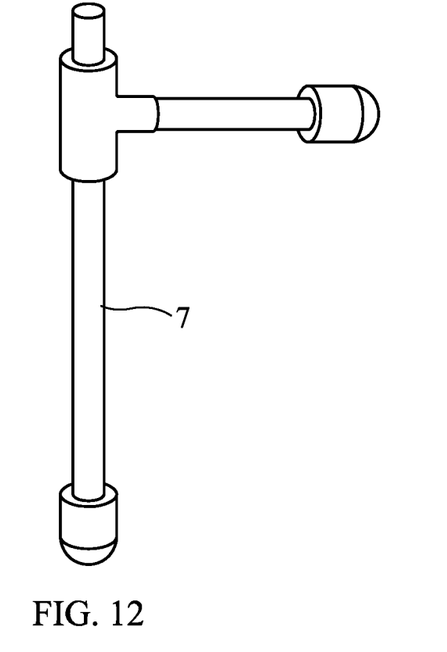
FIG. 12 is a diagrammatic, side elevation view illustrating a third exemplary test pipe equipped with a conventional acoustic side branch device tuned as a 190 Hz resonator with damping material in the side-branch.

With due consideration of the design objectives for the acoustic silencer and its location relative to pressure nodes/anti-nodes (step 3, FIG. 9), the next step is to select the type of insert 2, 3, 4 for the expanded volume 8 to best target suppression of frequencies of concern (step 4, FIG. 9). The level of performance for the selected configuration can be determined by constructing a scale model from PVC piping, and using a speaker, a computer sound card, and a microphone. Alternative technologies to design and confirm the performance of the acoustic silencer 1 exist and can include using computational fluid dynamic analysis software that is widely available with the capability of modeling more complex responses.

To minimize flow-head losses through this invention, it is advised to maintain the process piping bore 9 (or larger) through the acoustic silencer 1, but with a full or part length opening 10 to the expanded volume 13 to stimulate acoustic interference within that larger volume.

Figure 13:
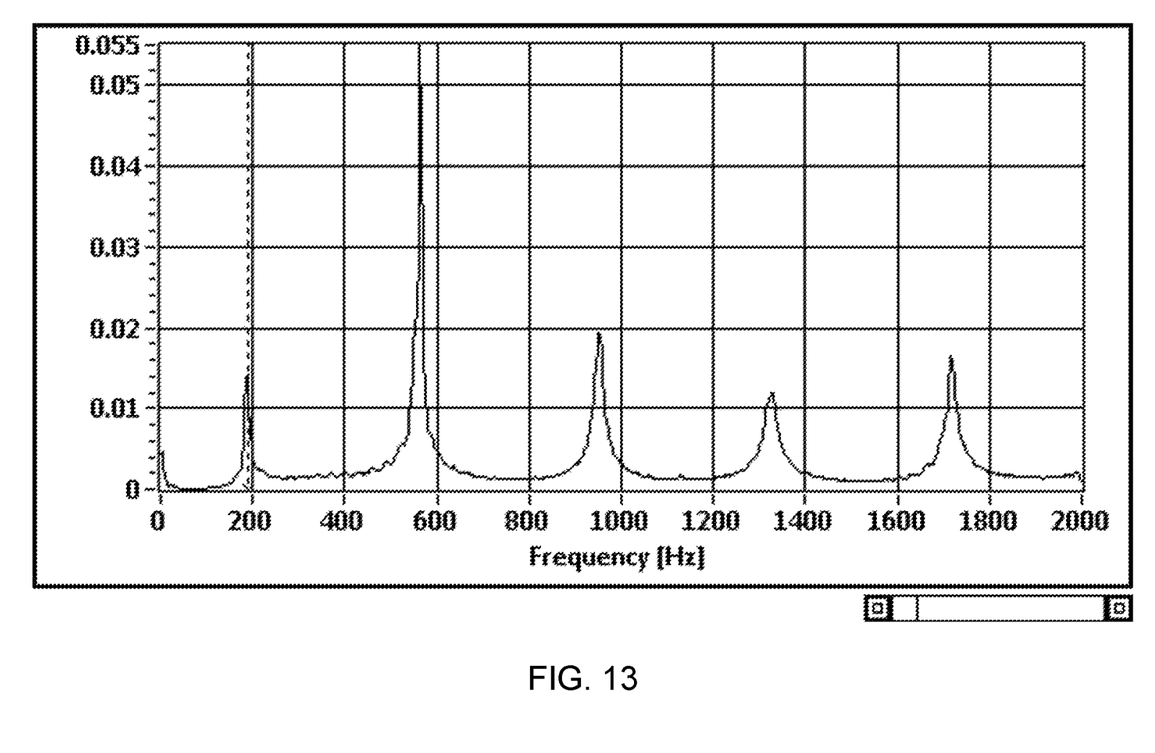
FIG. 13 is a graph showing test results of sound pressure level tests conducted using the test pipe from FIG. 10.
Figure 14:
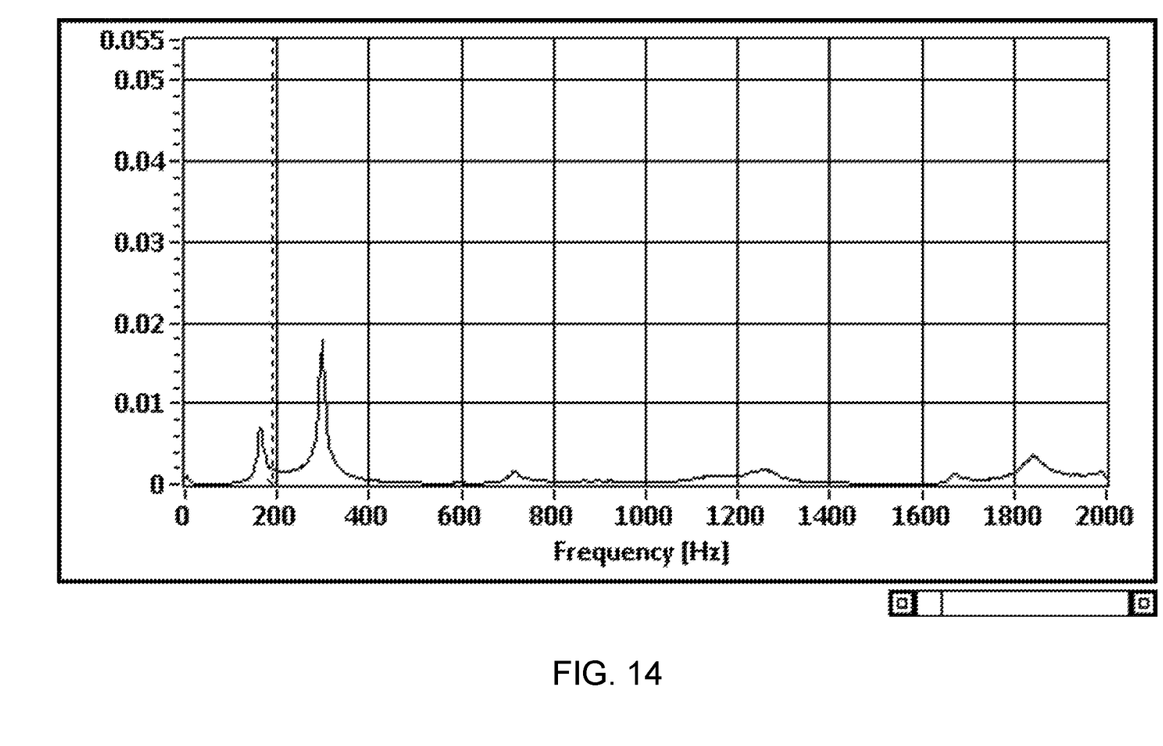
FIG. 14 is a graph showing test results of sound pressure level tests conducted using the test pipe from FIG. 11.
Figure 15:
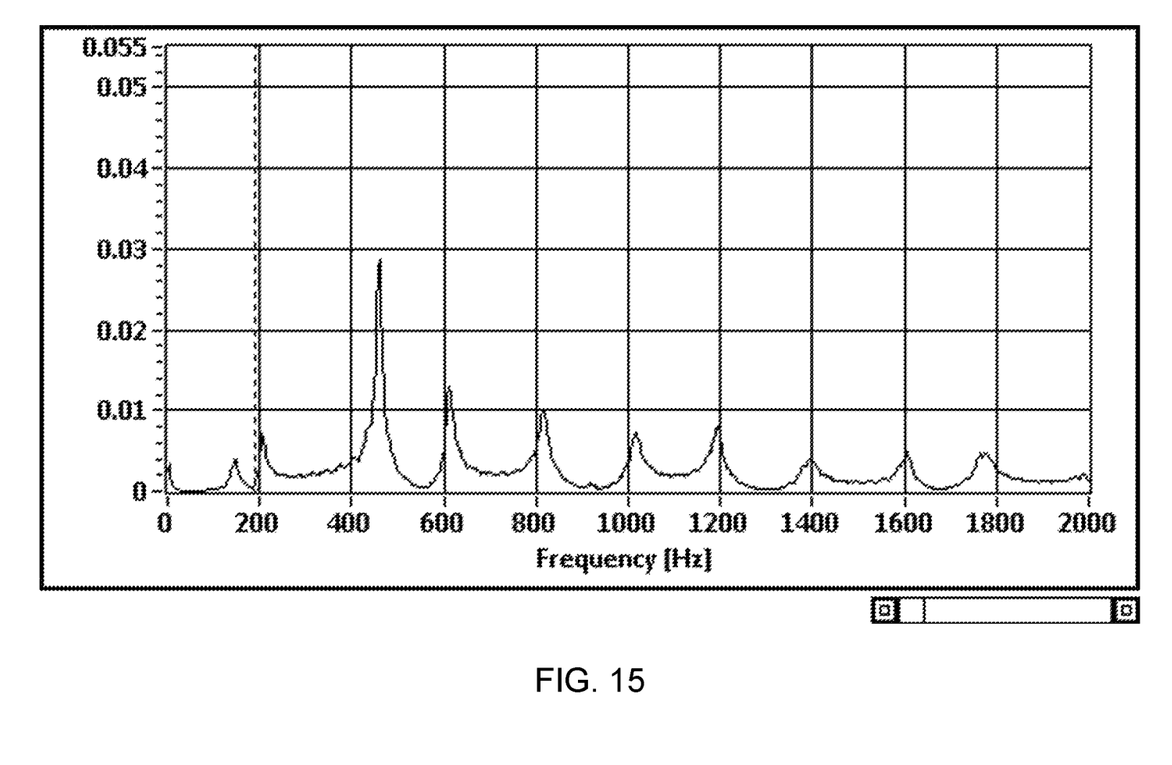
FIG. 15 is a graph showing test results of sound pressure level tests conducted using the test pipe from FIG. 12.

The Q-insert 2 has some similarities to a quarter-wave resonator in that it has an open end 10 and a closed end 11. But because of the geometry of the insert, the annular passage 13 between the insert and the outer wall is not a pure quarter-wave resonator and does not represent a typical uniaxial/one-dimensional wave-guide/pipe as for example an acoustic side-branch would. Instead, it forms a hybrid between a simple cavity and a quarter-wave resonator with resonant characteristics that are more complex and disruptive of the natural frequency mode shapes that the expansion chamber 8 on its own would have presented, as illustrated in FIGS. 13-15, resulting in broad-band frequency suppression characteristics.

By comparison, the natural acoustic frequency and integer multiple higher harmonics of uniaxial/one-dimensional quarter and half-wave resonators are calculated from Equation 2. The cut-off frequency for a quarter-wave resonator (Equation 3) may be utilized in the design process for the Q-insert 2 passage length 5.

$$F=c/(4*Lq) \text{ or } f=c/(2*Lq)$$

Equations 2: Fundamental tone frequencies of a quarter-wave (left) and half-wave resonators (right)
Where Lq=the length of the quarter-wave pipe.

The C-insert 3 (FIG. 5) has some similarities to a half-wave resonator made up of two quarter-wave resonators arranged back-to-back with a common-open end. In one embodiment of the C-insert, an optional barrier wall 11 placed opposite to the opening 10 where there exists a natural pressure anti-node, would demonstrate two back-to-back quarter-wave resonators with a common opening. Because of the device geometry, the annular passage 13 (FIG. 5) between the insert and the outer wall is not a pure half-wave resonator or two quarter-wave resonators and does not represent a typical uniaxial/one-dimensional wave-guide/pipe as for example a length of pipe would. Instead, it forms a hybrid between a simple cavity and a pipe resonator with resonant characteristics that are more complex and disruptive of the natural frequency mode shapes that the expanded volume 8 on its own would have presented, resulting in broad-band frequency suppression characteristics. Nevertheless, equations 2 and 3 may be utilized as a starting point for sizing the passage length 5 of the C-insert 3.

The S-insert 4, in one embodiment (FIG. 6), more closely represents a uniaxial/one-dimensional resonator, analogous to a quarter-wave acoustic side-branch for the case where the opening 10 is contained within only one revolution of the spiral passage (as illustrated in FIG. 4). In that embodiment, its performance as an acoustic suppression device improves the closer it is installed to a pressure anti-node in the process piping. In this particular embodiment, the S-insert 4 acts as a high-pass filter with a cut-off frequency that can be approximated by Equation 3. However, when the opening 10 in the S-insert 4 extends over more than one revolution of the spiral passage, its acoustic response deviates from a quarter-wave resonator and it assumes its own acoustic suppression characteristics.

$$f=c*a^2/(2*Ls)$$

Equation 3: Cut-off frequency of a quarter-wave high-pass filter
Where a=the cross sectional area of the spiral passage 5, and
Ls=the length of the spiral passage 5 from barrier wall 11 to barrier wall 11 with adjustment factors for the opening 10 configuration.

The presence of any of the three inserts 2, 3, 4 interfere with the acoustic mode shapes of the otherwise empty expansion chamber 8, forcing it into more complex mode shapes that interact with the process medium to accomplish suppression of acoustic pressure pulses over a wide range of frequencies.

The configuration of the openings 10 and barrier walls 11 of the 3 inserts 2,3,4 is a fundamental distinguishing characteristic compared to common muffler designs in two respects: Firstly, the broadband frequency suppression characteristics of this acoustic silencer device is obtained by ensuring that the annular passage 13 between the insert 2,3,4 and the expansion chamber has a circumferential length 5 that extends from the opening 10 to a barrier wall 11 or pressure anti-node in the case of the C-insert 4 where the barrier wall 11 at mid-distance is optional. A barrier wall 11 enforces the presence of a pressure anti-node (i.e. where reflected pressures are a maximum).

Secondly, in contrast to common muffler designs, the lengths of inserts 2,3,4 and their respective annular passages 13 run the full length the length of the expansion chamber with straight through continuation of the process piping as illustrated in FIGS. 2-6 and FIGS. 16-17.

FIGS. 2-6 depict embodiments with single instances of each insert 2,3,4 where in each case there is only one opening 10 in the process piping, while FIGS. 16-17 depict embodiments with 3 respective inserts 2,3,4 each, demonstrating 3 openings 10 such that each insert 2,3,4 instance still has only one opening 10 in the process piping 7, with the purpose of reducing the annular passage length 5.

While the suppression characteristics of the acoustic silencer 1 are very good, some applications may require even more suppression of undesirable tones, in which case the annular passage 13 between the insert 2/3/4 and the outer walls 8 of the acoustic silencer 1 may be filled with acoustic absorptive media. The damping efficiency of such absorptive media depends highly on its air-to-solid ratio which is directly related to it flow resistance. However, selecting an appropriate damping material presents a dilemma. A denser media will maximize flow resistance, but a less dense media will minimize reflection of pressure pulses off the damping media. An appropriate balance between these opposing characteristics is found when the opening ratio, for example of knitted or woven steel mesh as damping media, is in the range of 25% to 65%, though these are not limiting values. For example a coarser medium can be selected if enough resonant volume is available to accomplish the desired damping effects.

A number of embodiments of the present invention have been described. Nevertheless, it will be understood that various modifications may be made without departing from the spirit and scope of the invention. Accordingly, other embodiments are within the scope of the following exemplary claims.

What is claimed is:

1. An acoustic silencer comprising:
 an expansion chamber having an enclosed volume;
 a process pipe extending continuously through said enclosed volume;
 an annular volume defined within said enclosed volume between said expansion chamber and said process pipe along an entire length of the process pipe that extends through said expansion chamber;
 an insert disposed within said annular volume and extending along the length of the process pipe that extends through said expansion chamber;
 said insert defining an acoustic volume between said insert and said expansion chamber;
 said insert defining a resonate passage length within said acoustic volume, wherein said resonate passage length is of a length so as to dampen one or more frequencies of said process pipe;
 an opening through said process pipe along the length of the process pipe that extends through said expansion chamber, said opening extending over less than a circumference of said process pipe, and said opening in fluidic communication with said acoustic volume; and
 wherein said insert is a C-type insert.

2. The acoustic silencer of claim 1, wherein said C-type insert includes a barrier wall disposed within said annular space and extending between said expansion chamber and said process pipe, and wherein said barrier wall serves to shorten said resonate passage length.

3. An acoustic silencer comprising:
 an expansion chamber having an enclosed volume;
 a process pipe extending continuously through said enclosed volume;
 an annular volume defined within said enclosed volume between said expansion chamber and said process pipe along an entire length of the process pipe that extends through said expansion chamber;
 an insert disposed within said annular volume and extending along the length of the process pipe that extends through said expansion chamber;
 said insert defining an acoustic volume between said insert and said expansion chamber;
 said insert defining a resonate passage length within said acoustic volume, wherein said resonate passage length is of a length so as to dampen one or more frequencies of said process pipe;
 an opening through said process pipe along the length of the process pipe that extends through said expansion chamber, said opening extending over less than a circumference of said process pipe, and said opening in fluidic communication with said acoustic volume; and
 wherein said insert is a Q-type insert having a barrier wall disposed within said annular space that extends between said process pipe and said expansion chamber and has a length that runs along an edge of said opening through said process pipe, and wherein said barrier wall serves to shorten said resonate passage length.

4. The acoustic silencer of claim 1, wherein said annular volume is free of being filled by damping material.

5. The acoustic silencer of claim 3, wherein said annular volume is free of being filled by damping material.

6. An acoustic silencer comprising:
 an expansion chamber having an enclosed volume;
 a process pipe extending continuously through said enclosed volume;
 an annular volume defined within said enclosed volume between said expansion chamber and said process pipe along an entire length of the process pipe that extends through said expansion chamber;
 two or more inserts disposed within said annular volume and extending along the length of the process pipe that extends through said expansion chamber;
 each of said two more inserts defining a respective and separate acoustic volume between said insert and said expansion chamber;
 each said two or more inserts defining a respective and separate resonate passage length within its respective acoustic volume, wherein each of said resonate passage lengths are of a length so as to dampen a desired frequency of said process pipe; and
 an opening for each of said two or more inserts through said process pipe along the length of the process pipe that extends through said expansion chamber, each opening extending over less than a circumference of said process pipe, and each opening being in fluidic communication with one respective acoustic volume; and
 wherein at least one of said two or more inserts is a C-type insert.

7. The acoustic silencer of claim 6, wherein said annular volume is free of being filled by damping material.

8. The acoustic silencer of claim 6, wherein said C-type insert includes a barrier wall disposed within said annular space and extending between said expansion chamber and said process pipe, and wherein said barrier wall serves to shorten a resonate passage length.

9. An acoustic silencer comprising:
   an expansion chamber having an enclosed volume;
   a process pipe extending continuously through said enclosed volume;
   an annular volume defined within said enclosed volume between said expansion chamber and said process pipe along an entire length of the process pipe that extends through said expansion chamber;
   two or more inserts disposed within said annular volume and extending along the length of the process pipe that extends through said expansion chamber;
   each of said two more inserts defining a respective and separate acoustic volume between said insert and said expansion chamber;
   each said two or more inserts defining a respective and separate resonate passage length within its respective acoustic volume, wherein each of said resonate passage lengths are of a length so as to dampen a desired frequency of said process pipe; and
   an opening for each of said two or more inserts through said process pipe along the length of the process pipe that extends through said expansion chamber, each opening extending over less than a circumference of said process pipe, and each opening being in fluidic communication with one respective acoustic volume; and
   wherein at least one said two or more inserts is a Q-type insert having a barrier wall disposed within said annular space that extends between said process pipe and said expansion chamber and has a length that runs along an edge of its respective said opening through said process pipe, and wherein said barrier wall serves to shorten a resonate passage length.

10. The acoustic silencer of claim 9, wherein said annular volume is free of being filled by damping material.

* * * * *